(12) United States Patent
Axelsson et al.

(10) Patent No.: US 7,179,035 B2
(45) Date of Patent: Feb. 20, 2007

(54) LOCKING NUT

(75) Inventors: Uno Axelsson, Katrineholm (SE); Henrik Olsson, Katrineholm (SE)

(73) Assignee: Aktiebolaget SKF, Gothenburg (SE)

( * ) Notice: Subject to any disclaimer, the term of this patent is extended or adjusted under 35 U.S.C. 154(b) by 0 days.

(21) Appl. No.: 10/995,205

(22) Filed: Nov. 24, 2004

(65) Prior Publication Data

US 2005/0117995 A1 Jun. 2, 2005

(30) Foreign Application Priority Data

Nov. 28, 2003 (SE) .................................. 0303191

(51) Int. Cl.
*F16B 39/04* (2006.01)

(52) U.S. Cl. ..................... 411/295; 411/255; 411/279

(58) Field of Classification Search ............... 411/294, 411/295, 277–279, 281, 293, 246, 254, 255
See application file for complete search history.

(56) References Cited

U.S. PATENT DOCUMENTS

| 189,747 | A | * | 4/1877 | Kennard ..................... 411/295 |
| 602,120 | A | * | 4/1898 | Wright ....................... 411/294 |
| 1,289,167 | A | * | 12/1918 | Hatten ....................... 411/295 |
| 2,482,214 | A | * | 9/1949 | Rogie ......................... 439/687 |
| 2,562,143 | A | * | 7/1951 | Godfrey et al. ............. 403/104 |
| 4,436,468 | A | * | 3/1984 | Ozaki et al. ................. 411/248 |
| 4,645,395 | A |  | 2/1987 | Lundgren |
| 5,454,674 | A |  | 10/1995 | Eriksson et al. |

FOREIGN PATENT DOCUMENTS

| EP | 0 336 140 A1 | 10/1989 |
| GB | 473545 | 10/1937 |
| SE | 435417 B | 9/1984 |

* cited by examiner

*Primary Examiner*—Flemming Saether
(74) *Attorney, Agent, or Firm*—Buchanan Ingersoll & Rooney PC

(57) ABSTRACT

A locking nut has an internal thread intended to be screwed up on a thread on a shaft and includes at least one locking element which, by way of at least one locking screw, is adapted to be pressed against the thread in the shaft, thereby locking the nut against unintentional unlocking. The locking element is provided with a releasing device incorporating at least one screw arranged to be in threaded engagement with the locking element for subjecting the locking element to a radial pulling force causing the locking element to be lifted from engagement with the shaft thread after loosening of the locking screws.

11 Claims, 2 Drawing Sheets

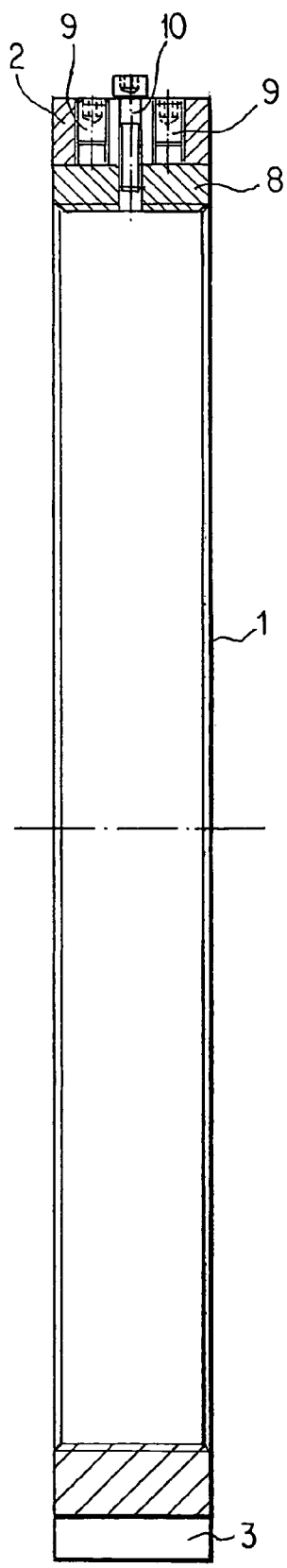
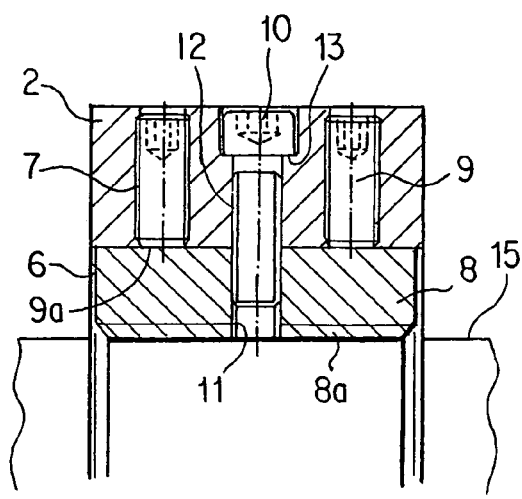
Fig. 2
Fig. 3

LOCKING NUT

This application is based on and claims priority under 35 U.S.C. § 119 with respect to Swedish Application No. 0303191-1 filed on Nov. 28, 2004, the entire content of which is incorporated herein by reference

FIELD OF THE INVENTION

The present invention generally pertains to a locking nut. More particularly, the invention relates to a locking nut having an internal thread intended to be screwed up on a thread on a shaft and having a locking element which, by way of at least one screw member, can be pressed against the thread in the shaft, thereby locking the nut against unintentional unlocking.

BACKGROUND DISCUSSION

A locking nut of the kind generally described above is disclosed in SE-435 417 C. The locking nut disclosed in this document has a number of internal recesses opening in the inner envelope surface of the nut and each one of the recesses is equipped with a locking element tightened by a screw. Each recess is formed with tapering wall portions and the locking elements are formed in correspondence therewith and are elastically deformable so that by their resiliency they are intended to move outwards from their locking positions when the screws are loosened.

However when using large versions of such locking nuts, e.g. for spindles of wind turbines, it has turned out that the counter-force obtained by the resiliency of the locking elements when the screws are loosened is insufficient for moving the locking elements out of their locking positions. Thus, the locking nut will not be disengaged from the shaft.

SUMMARY

A locking nut is provided with an internal thread adapted to be screwed up on a thread of a shaft and comprises at least one locking element and at least one locking screw. The at least one locking element has a locking part adapted to be pressed against the thread of the shaft by the at least one locking screw to lock the nut against unintentional unlocking. The at least one locking element is provided with a releasing arrangement incorporating at least one release screw arranged to be in threaded engagement with the at least one locking element to subject the at least one locking element to a radial pulling force causing the at least one locking element to be lifted from engagement with the shaft thread after loosening of the at least one locking screw.

According to another aspect, a locking nut possesses an internal thread adapted to be screwed up on a thread of a shaft and comprises at least one locking element and at least one locking screw. A radially inwardly facing portion of the at least one locking element is adapted to be pressed against the thread of the shaft by the at least one locking screw to lock the nut against unintentional unlocking. The at least one locking element is positioned in a recess in an inner peripheral surface of the locking nut and comprises a threaded bore, and a release screw is adapted to engage the threaded bore of the at least one locking element to apply a radially outwardly directed force to the at least one locking element to lift the at least one locking element from engagement with the thread of the shaft after loosening of the at least one locking screw.

BRIEF DESCRIPTION OF THE DRAWING FIGURES

Additional features and details associated with the locking nut disclosed herein will become more apparent from the following detailed description considered with reference to the accompanying drawing figures in which like elements are designated by like reference numerals.

FIG. 2 is a cross-sectional view of the locking nut taken along the section line II—II in FIG. 1

FIG. 3 is an enlarged view of a portion of the locking nut shown in FIG. 2.

DETAILED DESCRIPTION

Figure 1:
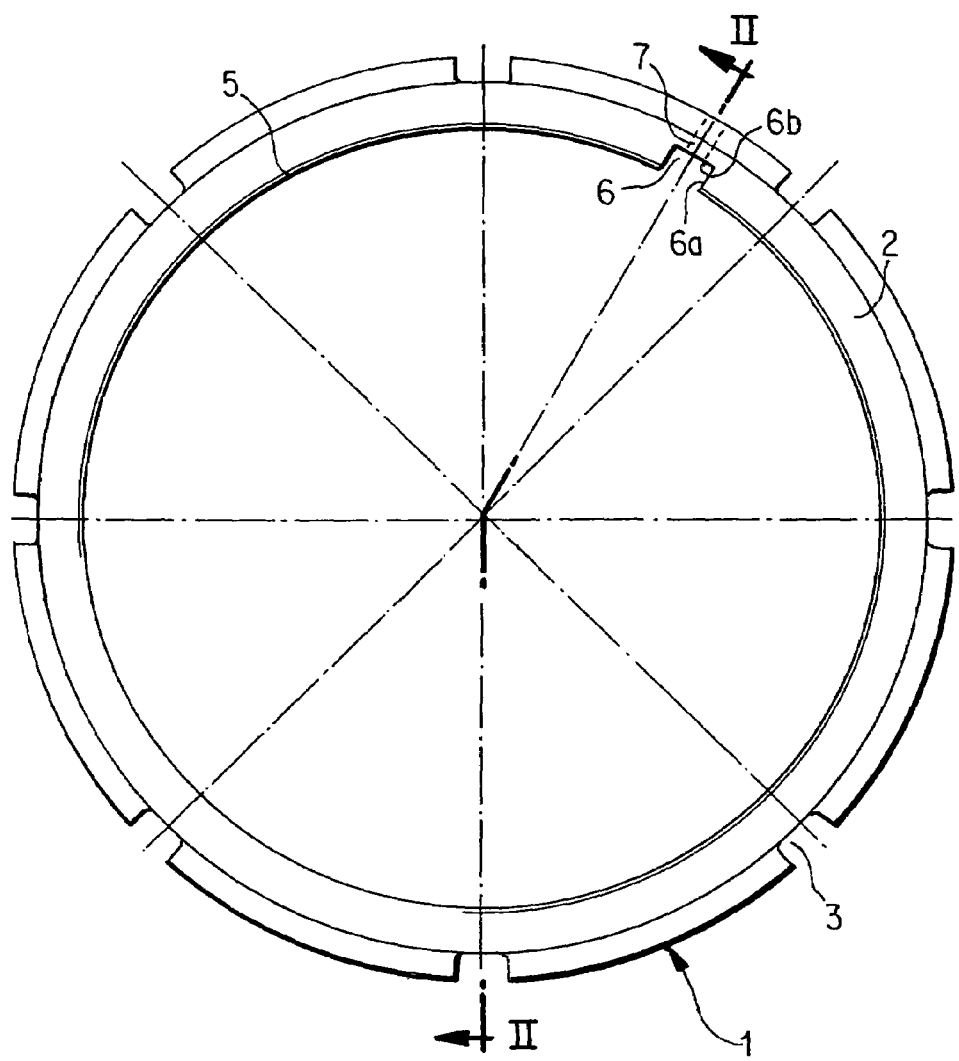
FIG. 1 is a side view of a locking nut according to an embodiment of the disclosed subject matter.

Referring initially to FIG. 1, a locking nut 1 according to one disclosed embodiment of the invention incorporates a ring member 2. The outer peripheral or envelope surface of the ring member 2 is provided with a number of circumferentially spaced apart recesses 3 intended to cooperate with a hook spanner or an impact spanner by which the nut is screwed on the threads in a shaft. The bore of the ring member 2 is provided with an internal thread, generally indicated at 5, intended to cooperate with a corresponding thread on the shaft.

An inner recess 6 is provided along the internal peripheral or envelope surface of the ring member 2. This recess 6 opens inwardly. The inner recess 6 extends along a short length (short inner circumferential distance) of the inner peripheral surface. In the illustrated embodiment, the recess 6 extends over a length of the inner envelope surface covering about 7°~8°. The recess 6 is limited by straight side walls 6a and a bottom wall 6b perpendicular to the side walls.

Radial bores 7 are also provided through the ring member 2 so that they open into the bottom wall 6b of the inner recess 6. In FIG. 1, only one such bore 7 is visible, but as can be seen in FIGS. 2 and 3, more bores are provided, preferably arranged along a straight axial line.

FIGS. 2 and 3 illustrate a locking insert 8 positioned in the inner recess 6. In addition, two locking screws 9, for example set screws, are positioned in and extend through the bores 7 in the ring member 2. FIG. 2 also illustrates a release screw 10.

FIG. 3 shows that the locking insert 8 has a shape that complements and is the same as that of the inner recess 6 in the ring member 2. The locking insert 8 has an inner edge 8a intended to cooperate with the threads of the shaft 15 for locking the nut on the shaft. The locking insert 8 is further provided with a threaded through-bore 11. This threaded through-bore 11 is situated to correspond in position and direction with a smooth bore 12 which extends through the ring member. The bore 12 is provided with a shoulder 13 as illustrated. The release screw 10 is positioned to extend through the bore 12, with the head of the release screw 10 engaging against the shoulder 13. The threaded release screw is arranged to be in threaded engagement with the bore 11 in the locking insert 8.

When the locking nut 1 is to be locked to a shaft, it is first positioned around the shaft in a desired position, e.g., by being screwed up on the shaft. At this moment the screw 10 has earlier been positioned in the bore 12 and tightened so much in the threaded bore 11 in the locking insert 8 that the locking insert will be safely kept in its recess 6. When the locking nut thus has reached the desired position, the release screw 10 is loosened and thereupon the set screws 9 in the threaded bores 7 are tightened. This causes the end faces 9a of the screws to exert pressure on the locking insert 8, which thereby will press its edge 8a against the threads on the shaft to cause a firm grip between the locking nut and the shaft. Thereupon, the release screw 10 is tightened sufficiently to prevent the locking insert 8 from coming loose due to vibrations during operation of the device in which the shaft is incorporated.

When the locking nut 1 is to be dismounted, the screws 9 are loosened or unscrewed from their bores 7, thereby terminating their pushing force upon the locking insert 8. Particularly for large locking nuts, the grip against the shaft is not always relieved, due to insufficient resiliency in the locking insert 8 and in the ring member 4. That is, the grip will remain in spite of the fact that the screws 9 are removed.

To effect a release of the locking nut 1 from the shaft at such a situation, the release screw 10 is then screwed in further. As the release screw is not in threaded engagement with the smooth part 12 of its bore but is in threaded engagement against the threads in the bore 11 of the locking insert 8, the tightening of the release screw 10 will subject the locking insert 8 to a "pulling" force, causing the locking insert 8 to be raised from the shaft and thereby to relieve its grip.

The invention is not limited to the arrangement illustrated and described, but modifications and variants are possible within the scope of the accompanying claims. Thus although the schematic drawing figures have illustrated a locking nut having a single locking insert tightened by way of two screws and released by way of one release screw, it is to be understood that the locking nut can have more than one recess 6, which recesses are then preferably evenly spaced around the circumference of the locking nut ring member 2, and each recess can have its own locking insert. Furthermore the number of screws can be altered, although it is desirable to have a relatively small number of locking and release screws. The shape of the recess 6 and the complimentary locking insert have been shown as substantially parallelepipedic, but there are of course also other shapes which can give a generally corresponding result.

The embodiment of the locking nut described and illustrated here gives a relatively reliable and safe locking effect and can be relatively readily un-locked, even in its locking position in which the locking nut can be subjected to very large forces.

The principles, preferred embodiments and modes of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A locking nut comprising an internal thread adapted to be screwed up on a thread of a shaft, the locking nut comprising at least one locking element and at least one locking screw, the at least one locking element having a locking part adapted to be pressed against the thread of the shaft by the at least one locking screw to lock the nut against unintentional unlocking, the at least one locking element being provided with a releasing means for subjecting the at least one locking element to a radial pulling force causing the at least one locking element to be lifted from engagement with the shaft thread after loosening of the at least one locking screw;

wherein the releasing means comprises at least one release screw arranged to be in threaded engagement with the at least one locking element;

wherein the at least one locking element is positioned in an inner recess in an inner peripheral surface of the locking nut, and the at least one locking screw and the at least one release screw extend through respective radial bores in the locking nut which are positioned to coincide with the inner recess of the locking nut; and wherein the at least one release screw extends through a smooth radial bore in the locking nut and is in threaded engagement with the at least one locking element by way of a threaded bore in the at least one locking element, the threaded bore in the at least one locking element coinciding in position and direction with the smooth radial bore in the locking nut, the smooth radial bore in the locking nut comprising means for limiting the distance the at least one release screw can be screwed into the radial bore in the locking nut.

2. A locking nut according to claim 1, wherein the means limiting the distance the at least one release screw can be screwed into the radial bore is a shoulder cooperating with a head of the at least one release screw.

3. A locking nut according to claim 2, wherein the radial bore in which is positioned the at least one locking screw is a threaded radial bore, the at least one locking screw being a set screw in threaded engagement with the threaded radial bore in the locking nut, the locking nut possessing an end face adapted to engage radially inwardly a surface of the at least one locking element facing away from the locking part.

4. A locking nut according to claim 3, wherein an external peripheral surface of the locking nut is provided with recesses acting as key grips for a tool for screwing up the locking nut on the shaft.

5. A locking nut according to claim 1, wherein the radial bore through which the at least one locking screw extends is a threaded radial bore in the locking nut and the locking screw is in threaded engagement with the threaded radial bore in the locking nut, the locking nut possessing an end face adapted to engage radially inwardly a surface of the locking element facing away from the locking part.

6. A locking nut according to claim 1, wherein an external peripheral surface of the locking nut is provided with recesses acting as key grips for a tool for screwing up the locking nut on the shaft.

7. A locking nut comprising an internal thread adapted to be screwed up on a thread of a shaft, the locking nut comprising at least one locking element and at least one locking screw, a radially inwardly facing portion of the at least one locking element being adapted to be pressed against the thread of the shaft by the at least one locking screw to lock the nut against unintentional unlocking, the at least one locking element being positioned in a recess in an inner peripheral surface of the locking nut and comprising a threaded bore, and a release screw adapted to engage the threaded bore of the at least one locking element to apply a radially outwardly directed force to the at least one locking element to lift the at least one locking element from engagement with the thread of the shaft after loosening of the at least one locking screw;

wherein the at least one locking screw and the at least one release screw extend through respective radial bores in the locking nut which open into the recess of the locking nut; and wherein the at least one release screw extends through a smooth radial bore in the locking nut, the threaded bore in the at least one locking element being aligned with the smooth radial bore in the locking nut.

8. A locking nut according to claim 7, wherein the smooth radial bore in the locking nut comprises a shoulder which is adapted to cooperate with a head of the at least one release screw to limit an extent to which the at least one release screw can be screwed into the radial bore in the locking nut.

9. A locking nut according to claim 8, wherein the radial bore through which the at least one locking screw extends is a threaded radial bore, the locking nut possessing an end face adapted to engage radially inwardly a surface of the at least one locking element facing away from the locking part.

10. A locking nut according to claim 9, wherein an external peripheral surface of the locking nut is provided with recesses acting as key grips for a tool for screwing up the locking nut on the shaft.

11. A locking nut according to claim 9, wherein the smooth radial bore in the locking nut comprises a shoulder which is adapted to cooperate with a head of the at least one release screw to limit an extent to which the at least one release screw can be screwed into the radial bore in the locking nut.

* * * * *